(12) United States Patent
Kopparapu et al.

(10) Patent No.: US 12,354,355 B2
(45) Date of Patent: *Jul. 8, 2025

(54) MACHINE LEARNING-BASED SELECTION OF A REPRESENTATIVE VIDEO FRAME WITHIN A MESSAGING APPLICATION

(71) Applicant: Snap Inc., Santa Monica, CA (US)

(72) Inventors: Kavya Venkata Kota Kopparapu, Herndon, VA (US); Benjamin Dodson, Dover, NH (US); Francesc Xavier Drudis Rius, Bellevue, WA (US); Angus Kong, Seattle, WA (US); Richard Leider, San Francisco, CA (US); Jian Ren, Marina Del Ray, CA (US); Sergey Tulyakov, Santa Monica, CA (US); Jiayao Yu, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,718

(22) Filed: May 2, 2024

(65) Prior Publication Data
US 2024/0282110 A1 Aug. 22, 2024

Related U.S. Application Data

(63) Continuation of application No. 17/550,852, filed on Dec. 14, 2021, now Pat. No. 12,008,811.
(Continued)

(51) Int. Cl.
G06K 9/00 (2022.01)
G06F 16/783 (2019.01)
(Continued)

(52) U.S. Cl.
CPC ............ *G06V 20/46* (2022.01); *G06F 16/785* (2019.01); *G06N 20/00* (2019.01); *G06T 5/70* (2024.01); *G06V 10/70* (2022.01); *G06V 20/70* (2022.01)

(58) Field of Classification Search
CPC ........ G06T 13/40; G06T 13/80; G06N 3/006; G06N 5/02; G06N 5/04; G06N 20/00;
(Continued)

(56) References Cited

U.S. PATENT DOCUMENTS 5,880,731 A 3/1999 Liles et al.
6,023,270 A 2/2000 Brush et al.
(Continued)

FOREIGN PATENT DOCUMENTS

CN 109863532 A 6/2019
CN 110168478 A 8/2019
(Continued)

OTHER PUBLICATIONS

"U.S. Appl. No. 17/550,852, Notice of Allowance mailed Feb. 5, 2024", 15 pgs.
(Continued)

Primary Examiner — Alex Kok S Liew
(74) Attorney, Agent, or Firm — Schwegman Lundberg & Woessner, P.A.

(57) ABSTRACT

Aspects of the present disclosure involve a system comprising a medium storing a program and method for machine-learning based selection of a representative video frame. The program and method provide for receiving a set of video frames; determining a first subset of frames by removing frames outside of an image quality threshold; determining a second subset by removing frames outside of an image stillness threshold; computing feature data for each frame in the second subset; providing, for each frame in the second
(Continued)

subset, the feature data to a machine learning model (MLM), the MLM being configured to output a score for each frame in the second subset of frames based on the feature data, the MLM having been trained with a first set of images labeled based on aesthetics, and with a second set of images labeled based on image quality; and selecting a frame based on output scores.

20 Claims, 10 Drawing Sheets

Related U.S. Application Data

(60) Provisional application No. 63/131,839, filed on Dec. 30, 2020.

(51) Int. Cl.
*G06N 20/00* (2019.01)
*G06T 5/70* (2024.01)
*G06V 10/70* (2022.01)
*G06V 20/40* (2022.01)
*G06V 20/70* (2022.01)

(58) Field of Classification Search
CPC .... G06F 3/011; G06F 3/0481; G06F 3/04815; G06F 3/04842; G06F 3/012; G06F 3/048; G06F 3/04817; G06V 40/171; G06V 40/176; G06V 40/165; G06V 40/168; G06V 40/16; G06V 20/20; G06V 40/166; G06V 40/174; G06V 40/175; G06V 20/47; G06V 40/161; G06V 40/167
See application file for complete search history.

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,892,324 B1 * | 2/2018 | Pachauri | G06V 10/763 |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,657,701 B2 | 5/2020 | Osman et al. | |
| 12,008,811 B2 * | 6/2024 | Kopparapu | G06F 16/739 |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |

(56) References Cited

U.S. PATENT DOCUMENTS

| | | |
|---|---|---|
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0055370 A1* | 2/2016 | Garcia ............... G06V 40/174 382/118 |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van et al. |
| 2017/0294010 A1* | 10/2017 | Shen .................. G06N 3/08 |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0061459 A1* | 3/2018 | Song .................. G06V 10/993 |
| 2018/0113587 A1 | 4/2018 | Allen et al. |
| 2018/0115503 A1 | 4/2018 | Baldwin et al. |
| 2018/0299841 A1 | 10/2018 | Appu et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0377955 A1 | 12/2019 | Swaminathan et al. |
| 2022/0207875 A1 | 6/2022 | Kopparapu et al. |

FOREIGN PATENT DOCUMENTS

| | | |
|---|---|---|
| CN | 116710978 A | 9/2023 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2022146707 A1 | 7/2022 |

OTHER PUBLICATIONS

"International Application Serial No. PCT/US2021/063823, International Preliminary Report on Patentability mailed Jul. 13, 2023", 9 pgs.

"International Application Serial No. PCT/US2021/063823, International Search Report mailed Mar. 28, 2022", 3 pgs.

"International Application Serial No. PCT/US2021/063823, Written Opinion mailed Mar. 28, 2022", 7 pgs.

Ouali, Yassine, et al., "An Overview of Deep Semi-Supervised Learning", Arxiv.Org, Cornell University Library, 201 Olin Library Cornell University Ithaca, NY 14853, (Jul. 6, 2020), 43 pgs.

Song, Yale, et al., "To Click or Not To Click", Conference on Information and Knowledge Management, ACM, 2 Penn Plaza, Suite 701 New York NY 10121-0701 USA,, (Oct. 24, 2018), 659-668.

Zhang, Y, et al., "Objective Video Quality Assessment Combining Transfer Learning With CNN", IEEE Transactions on Neural Networks and Learning Systems, vol. 31, No. 8, (Aug. 2020), 2716-2730.

"U.S. Appl. No. 17/550,852, Corrected Notice of Allowability mailed May 16, 2024", 2 pgs.

U.S. Appl. No. 17/550,852, filed Dec. 14, 2021, Machine Learning-Based Selection of a Representative Video Frame Within a Messaging Application.

* cited by examiner

MACHINE LEARNING-BASED SELECTION OF A REPRESENTATIVE VIDEO FRAME WITHIN A MESSAGING APPLICATION

CROSS-REFERENCE TO RELATED APPLICATION

This patent application is a continuation of U.S. patent application Ser. No. 17/550,852, filed Dec. 14, 2021, which application claims the benefit of U.S. Provisional Patent Application No. 63/131,839, filed Dec. 30, 2021, entitled "MACHINE LEARNING-BASED SELECTION OF A REPRESENTATIVE VIDEO FRAME WITHIN A MESSAGING APPLICATION", which are incorporated by reference herein in their entireties.

TECHNICAL FIELD

The present disclosure relates generally to a messaging system, including a messaging system which implements machine learning-based to select a representative video frame.

BACKGROUND

Messaging systems provide for the exchange of message content between users. For example, a messaging system allows a user to exchange message content (e.g., videos, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

A messaging system typically allow users to exchange content items (e.g., videos, images, audio and/or text) with one another. A messaging system may be configured to select a video frame which is representative of a particular video, for example, to be used as a thumbnail image for the video.

The disclosed embodiments provide for a messaging system configured to train and use a machine learning model for selection of a representative video frame. The messaging system utilizes various types of training data to train the machine learning model. For example, the training data may include aesthetic visual analysis (AVA) images (e.g., corresponding to a large-scale database separate from the messaging system) with labels corresponding to aesthetic scores.

The training data may also include randomly-selected video frames, stored in association with the messaging system, that are weakly-labeled. The weak labeling may include providing the randomly-selected video frames to the machine learning model as initially trained with the labeled AVA images, and using the output assessments (e.g., scores) to label the randomly-selected video frames. In addition, the messaging system downgrades image quality with respect to the randomly-selected video frames, for example, to explicitly train the machine learning model with images of decreased quality.

In addition, the machine learning model may be at least in part self-trained based on labeled and unlabeled video frames. For given videos associated with the messaging system, some video frames are labeled based on predefined preferences (e.g., a subject of the video being centered, foregrounded, appearing large, and the like). The labeled video frames are provided to the machine learning model as trained using the AVA video frames and the downgraded, randomly-selected video frames, to determine pseudo-labels for the unlabeled video frames. The labeled and pseudo-labeled video frames are then used to further train the machine learning model. The machine learning model is usable with respect to new image data (e.g., a new video), in order to rank the video frames for selection of which video frame(s) are representative of the new video.

Figure 1:
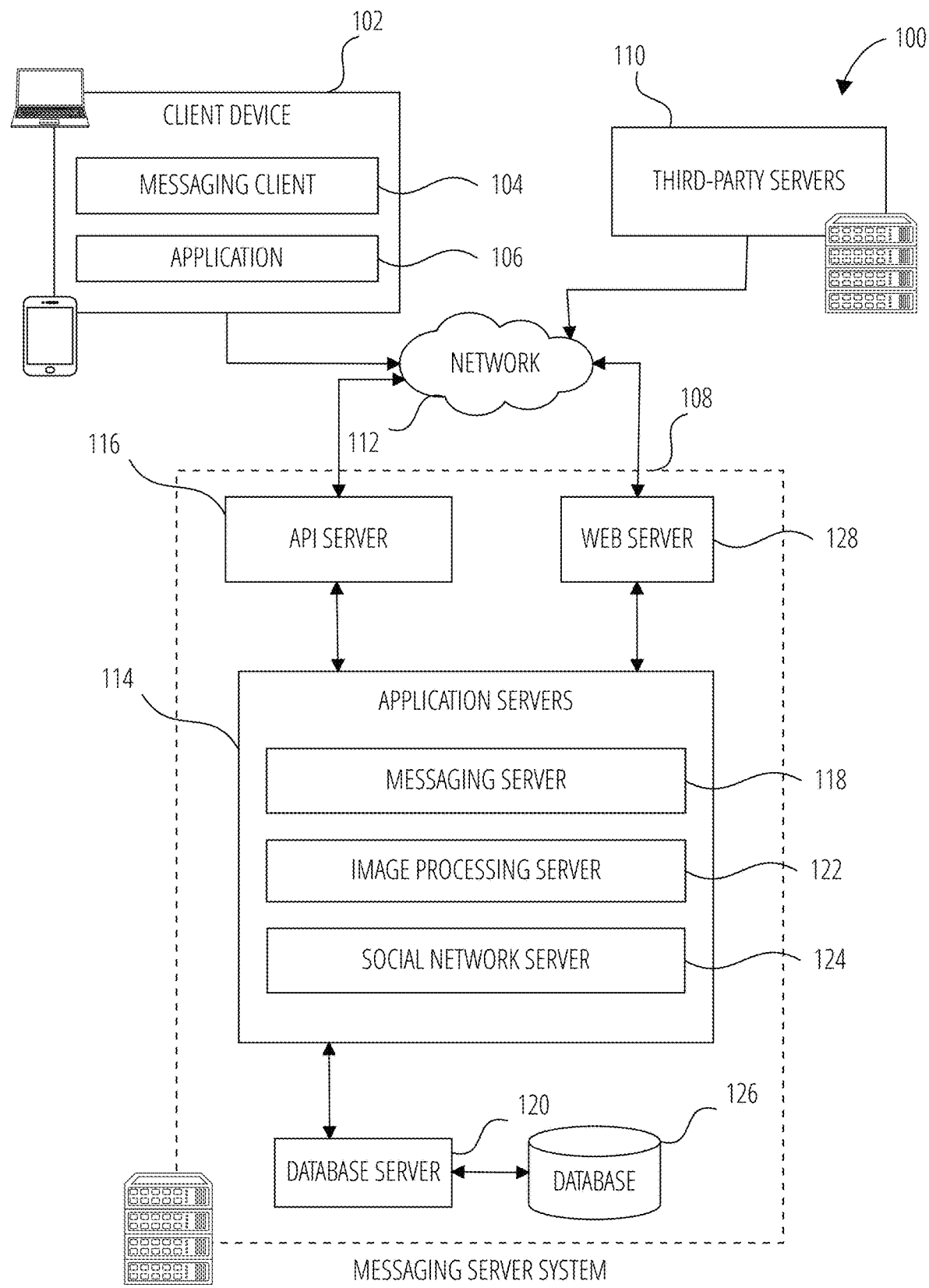
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
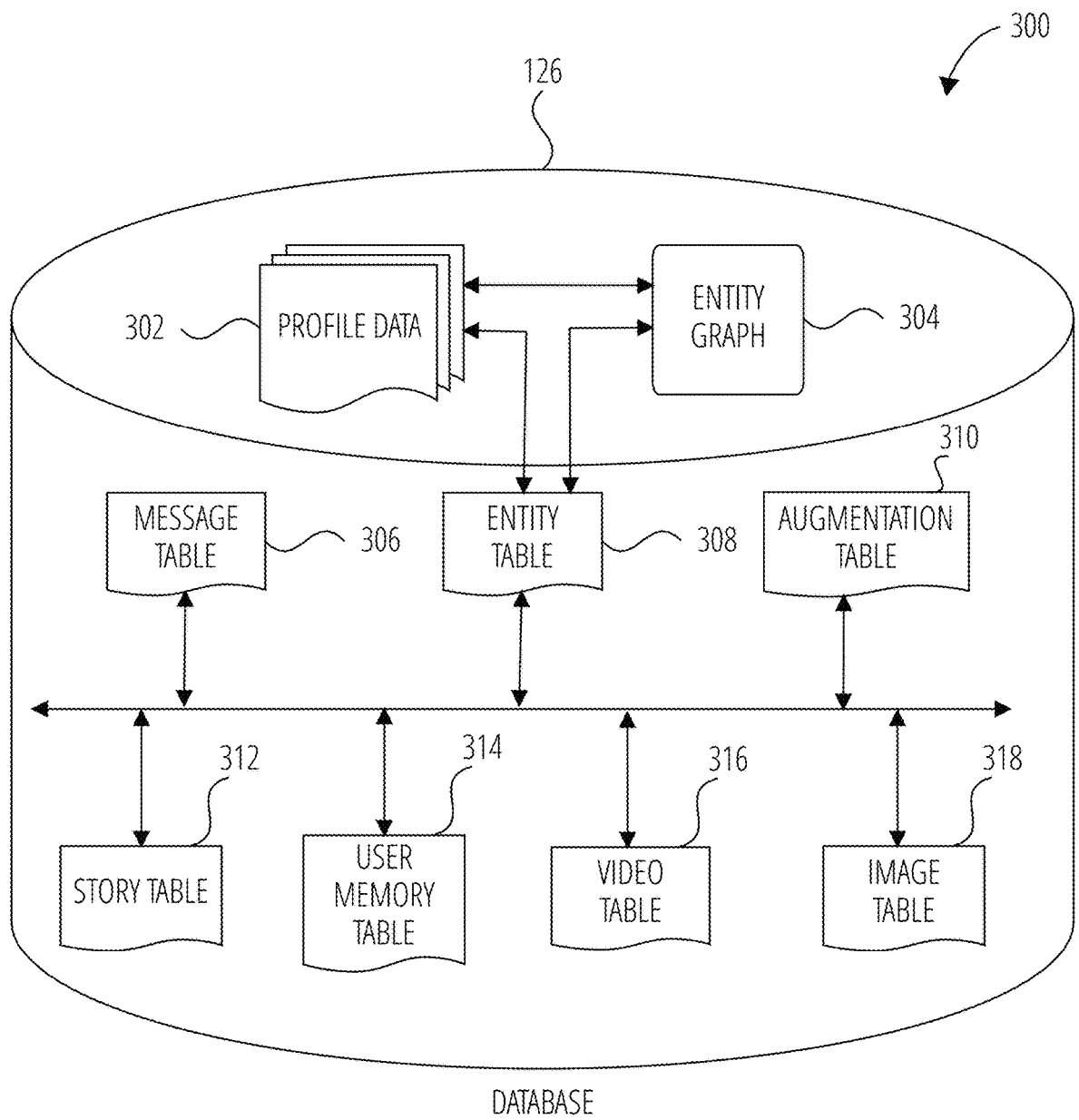
FIG. 3 is a diagrammatic representation of a data structure as maintained in a database, in accordance with some example embodiments.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
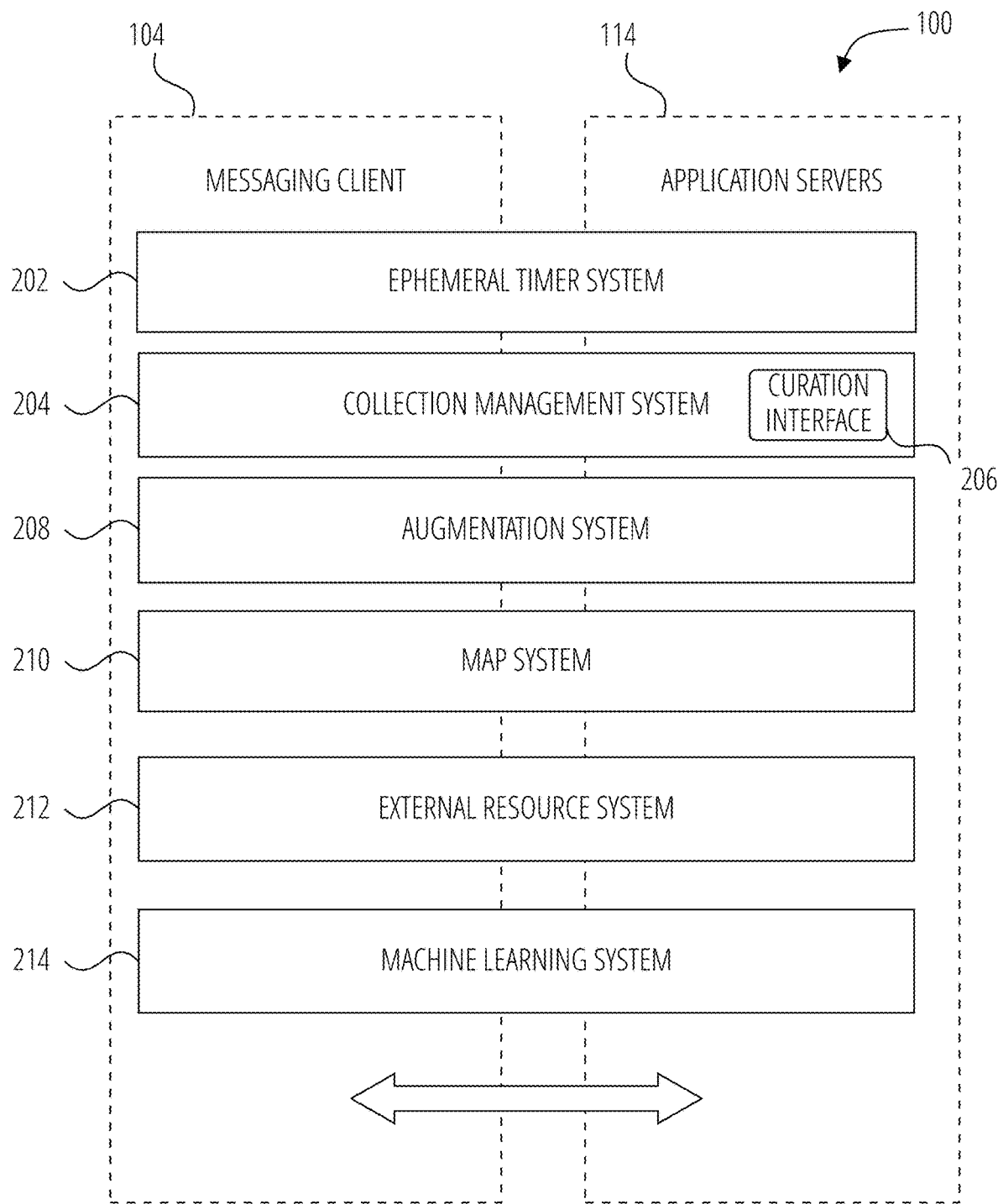
FIG. 2 is a diagrammatic representation of a messaging system, in accordance with some examples, that has both client-side and server-side functionality.

FIG. 2 is a block diagram illustrating further details regarding the messaging system 100, according to some example embodiments. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, an external resource system 212, and a machine learning system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video. To facilitate the presentation of augmented reality content, the augmentation system 208 may implement or otherwise access object recognition algorithms (e.g., including machine learning algorithms) configured to scan an image or video, and to detect/track the movement of objects within the image or video.

The map system 210 provides various geographic location functions, and supports the presentation of map-based media content and messages by the messaging client 104. For example, the map system 210 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The machine learning system 214 implements various functions for machine learning within the context of the messaging system 100. In one or more embodiments, the machine learning system 214 provides the messaging system 100 with the ability to learn without being explicitly programmed. The machine learning system 214 may implement or otherwise access machine learning algorithm(s) configured to learn from existing data and make predictions about new data. For example, the machine learning algorithm(s) operate by building a machine learning model from example training data in order to make data-driven predictions or decisions expressed assessments (e.g., or scores).

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 316) and images (for which data is stored in an image table 318).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 318 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

A user memory table 314 stores data regarding one or more "user memories," where each user memory corresponds to content (e.g., images, videos and/or audio files) saved by an individual user for subsequent access by that user. The creation and saving of a particular user memory may be initiated by the individual user (e.g., each user for which a record is maintained in the entity table 308). Moreover, each user memory stored within the user memory table 314 may be viewed, edited and/or sent by the individual user.

For example, if a user creates content (e.g., for exchanging with others in messaging), the created content, by default, may typically be automatically deleted and removed from storage after a specified time period (e.g., one hour, one minute, one second, etc.). However, if prior to the specified time period when the content is automatically deleted, the user selects the content for permanent retention (e.g., via a "save" interface), the content may be added as a user memory in the user memory table 314. The saved content may be accessible by the individual user for viewing, editing and/or sharing with other users.

As mentioned above, the video table 316 stores video data that, in one example, is associated with messages for which records are maintained within the message table 306. Similarly, the image table 318 stores image data associated with messages for which message data is stored in the entity table 308. The entity table 308 may associate various augmentations from the augmentation table 310 with various images and videos stored in the image table 318 and the video table 316.

Figure 4:
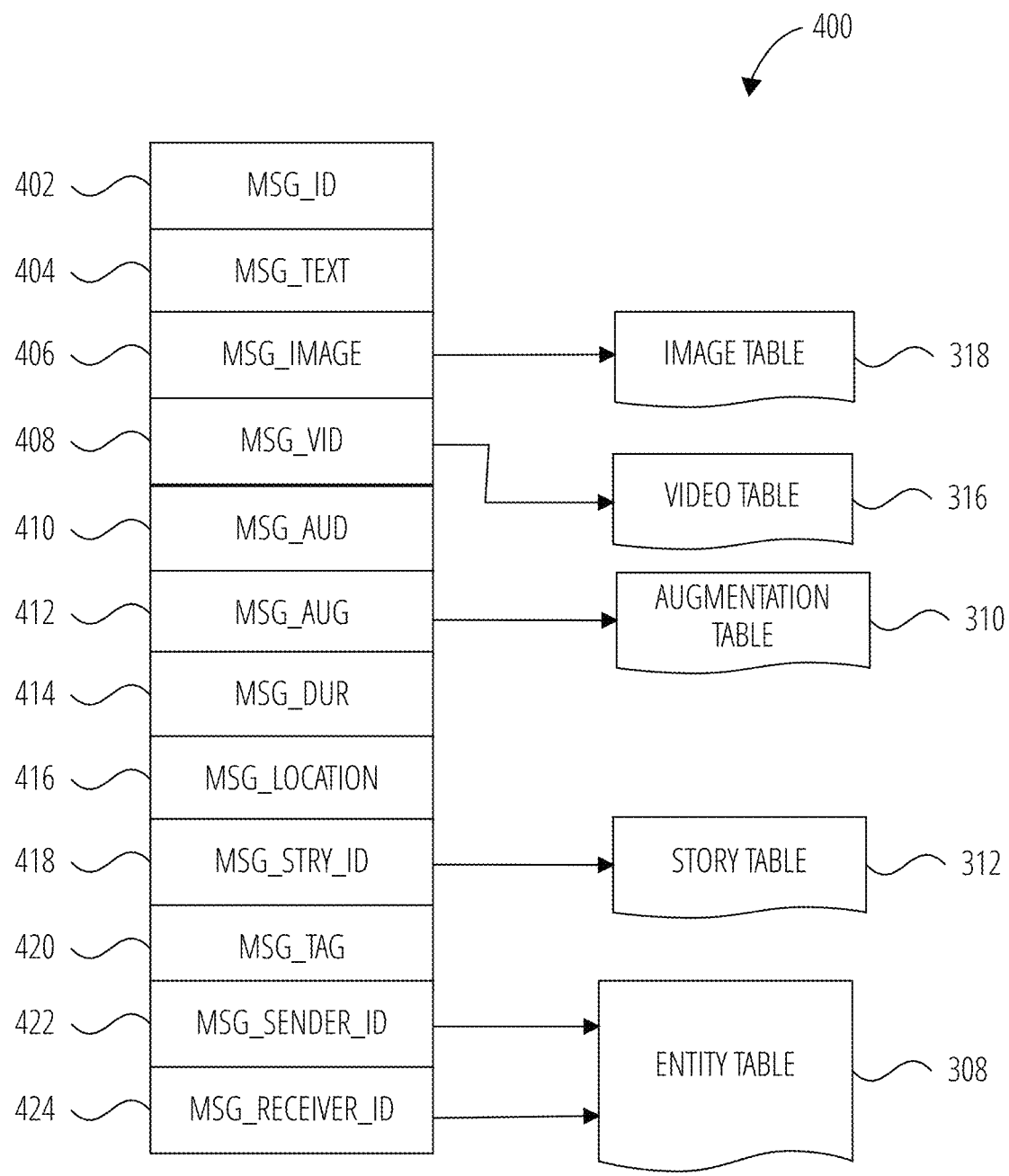
FIG. 4 is a diagrammatic representation of a message, in accordance with some example embodiments.

FIG. 4 is a schematic diagram illustrating a structure of a message 400, according to some example embodiments, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.
   message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 318.

message video payload 408: video data, captured by a camera component or retrieved from a memory component of the client device 102, and that is included in the message 400. Video data for a sent or received message 400 may be stored in the video table 316.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within a video table 316, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
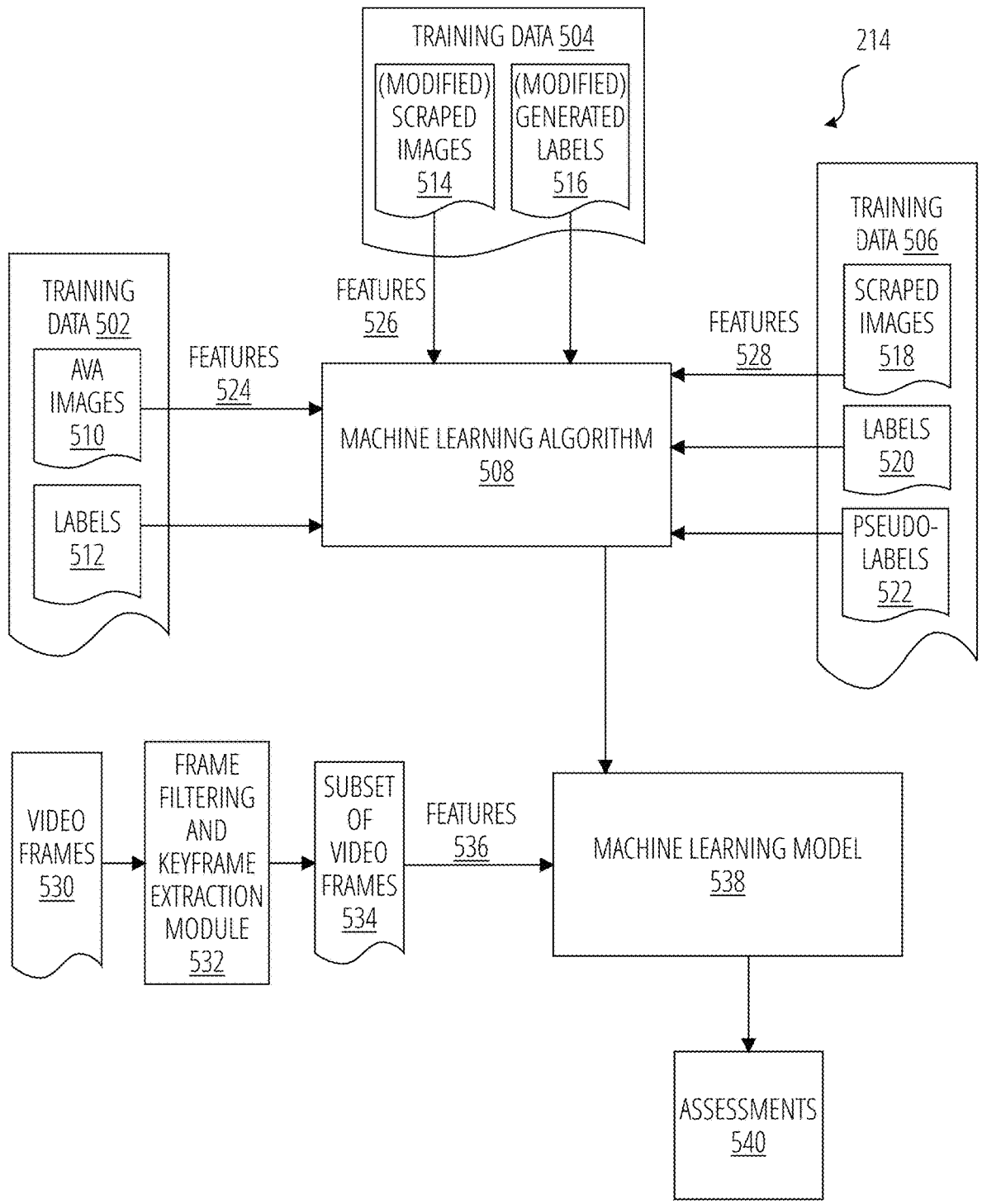
FIG. 5 illustrates a machine learning system for training and using a machine learning model for selection of a representative video frame, according to some example embodiments.

FIG. 5 illustrates a machine learning system 214 for training and using a machine learning model 538 for selection of a representative video frame, according to some example embodiments. In one or more embodiments, the machine learning system 214 is used to perform operations associated with determining assessments 540 (e.g., scores) for video frames, for ranking purposes. Not all of the depicted components may be used in all implementations, and one or more embodiments may include additional or different components than those shown in the figure. Variations in the arrangement and type of the components may be made without departing from the spirit or scope of the claims as set forth herein.

As noted above, the machine learning system 214 may correspond to a subsystem of the messaging system 100, and may be supported on the client side by the messaging client 104 and/or on the server side by the application servers 114. In one or more embodiments, training and use of the machine learning model 538 may be implemented client side, server side and/or a combination of client side and server side.

As described herein, the machine learning system 214 provides for training the machine learning model 538 with different types of training data. For example, the training data 502 includes aesthetic visual analysis (AVA) images with labels corresponding to aesthetic scores. In addition, the training data 504 includes randomly-selected video frames, stored in association with the messaging system 100, that are weakly-labeled. The weak labeling includes providing the randomly-selected video frames to the machine learning model 538 as initially trained by the labeled AVA images. The machine learning system 214 downgrades quality with respect to the randomly-selected video frames, for example, to explicitly train the machine learning model with video frames of decreased quality. Moreover, the machine learning model 538 is at least in part self-trained based on labeled and unlabeled video frames (e.g., the training data 506). For given videos associated with the messaging system 100, some video frames are labeled based on predefined preferences (e.g., a subject being centered, foregrounded, appearing large, etc.). The labeled video frames are provided to the machine learning model 538 (as trained using the AVA video frames and the downgraded, randomly-selected video frames) to determine pseudo-labels for the unlabeled video frames. The labeled and pseudo-labeled video frames are then used to further train the machine learning model 538. The machine learning model 538 is usable with respect to new image data (e.g., a new video), in order to rank the video frames with respect to which frame(s) best represent the new video.

As shown in the example of FIG. 5, the machine learning system 214 includes: training data 502 associated with AVA images 510, features 524 and labels 512; training data 504 associated with machine learning system 214, features 526 and (modified) generated labels 516; training data 506 associated with scraped images 518, features 528, labels 520 and pseudo-labels 522; a machine learning algorithm 508;

video frames 530; frame filtering and keyframe extraction module 532; a subset of video frames 534; features 536; the machine learning model 538; and assessments 540. Not all of the depicted components may be used in all implementations, however, and one or more embodiments may include additional or different components than those shown in the figure. Variations in the arrangement and type of the components may be made without departing from the spirit or scope of the claims as set forth herein. Additional components, different components, or fewer components may be provided.

The machine learning system 214 provides the messaging system 100 with the ability to learn without being explicitly programmed. The machine learning system 214 may implement or otherwise access machine learning algorithm(s) (e.g., the machine learning algorithm 508) configured to learn from existing data and make predictions about new data. For example, the machine learning algorithm(s) operate by building the machine learning model 538 from example training data (e.g., training data 502-506) in order to make data-driven predictions or decisions expressed as assessments 540 (e.g., scores).

Two common types of problems in machine learning are classification problems and regression problems. Classification problems, also referred to as categorization problems, aim at classifying items into one of several category values (e.g., object identification). Regression problems aim at quantifying some items (e.g., by providing a value for ranking purposes). Different machine-learning algorithms may be used to address classification and/or ranking problems. Examples of machine learning algorithms include but are not limited to Random Forest (RF), neural networks (NN), Logistic Regression (LR), Naive-Bayes, matrix factorization, and Support Vector Machines (SVM) algorithms. In the example of FIG. 5, the machine learning algorithm 508 may implement or otherwise access one or more machine learning algorithms.

In general, a machine learning algorithm (e.g., the machine learning algorithm 508) may train a machine learning model (e.g., the machine learning model 538) in different manners, such as by supervised learning and/or unsupervised learning. Supervised learning is the machine learning task of learning a function that maps an input to an output based on example input-output pairs. Supervised learning infers a function from labeled training data consisting of a set of training examples. On the other hand, unsupervised learning is a type of machine learning that looks for previously undetected patterns in a data set with no pre-existing labels and with minimum human supervision. As described herein, it is possible to train a machine learning model 538 using a combination of labeled and unlabeled data.

Regarding features 524-528 and 536, each individual feature is a measurable property of the data (e.g., the AVA images 510 images 510, the (modified) scraped images 514, the scraped images 518, and the subset of video frames 534) being analyzed. Each individual feature may be of a respective data type, such as a numeric value or a structured data (e.g., a histogram). The features 524-528 and 536 may represented by feature vectors. In one or more embodiments, a feature vector for a given image (e.g., video frame) may include respective values to represent one or more of: color mean and standard deviation for each channel (e.g., color channel) of the image; color histograms (e.g., percent of pixels of the image that falls within each bin); local binary patterns of the image; Gabor filter results (e.g., local energy and mean amplitude) for the image. Alternatively or in addition, a feature vector for an image may include respective values for one or more: image quality feature(s) (e.g., luminance, sharpness, uniformity and/or blurriness); image stillness feature(s) (e.g., based on pixel-wise frame difference between consecutive video frames); image color feature(s) (e.g., hue, saturation, brightness, color variation and/or color uniformity); and/or image composition feature(s) (e.g., the presence of objects, size of objects, position of objects, expressions or characteristics of objects such as facial expressions, open eyes, and the like).

As described herein, the machine-learning machine learning algorithm 508 uses the training data 502-506 to find correlations among the identified features 524-528 that affect the assessments 540 (e.g., scores). In one or more embodiments, the training data 502-506 includes respective labels (e.g., labels 512, (modified) generated labels 516, labels 520 and pseudo-labels 522). For example, the labels 512, 516, 520, 522 respectively corresponds to assessments (e.g., scores) for AVA images 510, (modified) scraped images 514 and scraped images 518. In one or more embodiments, such assessments may indicate the general quality of an image (e.g., video frame) and/or how well the video frame represents the entirety of a video (e.g., for thumbnail selection).

Thus, the machine learning algorithm 508 corresponds with training the machine learning model 538 with the training data 502-506, namely the features 524-528 and their respective labels 512, 516, 520, 522. The resulting machine learning model 538 is configured to receive new image data (e.g., a video) as input, and to generate assessments 540 (e.g., scores) for the new image data as output. As shown in the example of FIG. 5, the new image data may correspond to features 536 of a subset of video frames 534, where the subset of video frames 534 is generated using the frame filtering and keyframe extraction module 532 with the video frames 530. The messaging system 100 may select the video frame with the highest assessment (e.g., score) as the representative frame for the video (e.g., for thumbnail selection).

In one or more embodiments, the video frames 530 may correspond to a video stored in the video table 316. The video may correspond to one or more of a message (e.g., associated with the message table 306), a content collection (e.g., a Story, in association with the story table 312) or a user memory (e.g., associated with the user memory table 314). In one or more embodiments, the frame filtering and keyframe extraction module 532 performs frame filtering and keyframe extraction with respect to the video frames 530.

In one or more embodiments, the frame filtering corresponds with determining a first subset of the video frames 530. The frame filtering and keyframe extraction module 532 removes, from the video frames 530, those video frames which are outside of an image quality threshold. For example, the frame filtering and keyframe extraction module 532 is configured to filter out frames based on different image quantifiers. Each image quantifier may be assigned with a respective image quality threshold. The respective image quality thresholds may be predetermined based on testing performed with respect to each image quantifier. Thus, the frame filtering and keyframe extraction module 532 may filter out a certain percentage of video frames which fall outside of (e.g., above or below) the respective image quality threshold for each image quantifier.

In one or more embodiments, the image quantifiers include, but are not limited to: luminance (e.g., such that low-luminance frames are removed or filtered out); sharpness (e.g., measured via convolution with the Sobel operator, where the magnitude of the gradient is a measure of the difference between adjacent pixels; uniformity (e.g., measured via a greyscale histogram representation of the image/video frame); and blurriness (e.g., measured by the variance of the Laplacian of the image/video frame).

In one or more embodiments, the keyframe extraction corresponds with determining a second subset within the first subset of video frames. The frame filtering and keyframe extraction module 532 removes, from the first subset of video frames, those video frames which are outside of an image stillness threshold. One example rationale is that a device camera would stop to feature important objects during video capture. In one or more embodiments, the frame filtering and keyframe extraction module 532 is configured to calculate a respective stillness value between consecutive frames in the first subset of frames. A particular stillness value may correspond to pixel-wise frame difference across channels (e.g., the three RGB channels). The frame filtering and keyframe extraction module 532 removes a preset amount (e.g., a preset percentage) of video frames from the first subset based on the respective stillness values. For example, the bottom 60% of video frames, based on stillness values, are removed from the first subset in order to determine the second subset of frames. Thus, in one or more embodiments, the subset of video frames 534 corresponds to the second subset of frames.

The machine learning system 214 is configured to compute image descriptors for each of the subset of video frames 534. The image descriptors include, but are not limited to: color mean and standard deviation for each channel (e.g., color channel) of the image; color histograms (e.g., percent of pixels of the image that falls within each bin); local binary patterns of the image; Gabor filter results (e.g., local energy and mean amplitude) for the image. In addition, the machine learning system 214 is configured to generate feature vectors based on the image descriptors. The generated feature vectors correspond to the features 536 of the subset of video frames 534.

As noted above, the messaging system 100 as described herein is configured to select a representative frame within a video, for example, based at least in part on the features 536. In one or more embodiments, such selection may be based on different training approaches usable by the messaging system 100 (e.g., in conjunction with the machine learning system 214). The different approaches are referred to as "Approaches 1 to 4" described below. Approaches 1 to 4 may select a video frame which is deemed to be representative (e.g., based on image quality, aesthetics, user preferences) of the video frames 530, and can be used in lieu of simply selecting the first video frame within a video to represent the video.

With respect to Approach 1, the messaging system 100 is configured to cluster the respective feature vectors (e.g., features 536) corresponding to the subset of video frames 534. For example, the messaging system 100 implements or otherwise accesses a K-means clustering via Gap Statistics algorithm to perform the clustering. In this regard, such K-means clustering provides for dynamically determining the number of clusters based on the feature vectors. In one or more embodiments, the messaging system 100 is further configured to select one video frame from each cluster based on image stillness (e.g., the value having been determined as described above). Moreover, the representative frame for the video (e.g., the final "best" frame) is chosen based on a combination of the above-described stillness and blurriness values (e.g., lowest blur) as described above. Thus, Approach 1 corresponds to an example implementation which does not necessarily utilize the machine learning algorithm 508 depicted in FIG. 5.

On the other hand, Approaches 2 to 4 correspond to alternate implementations for utilizing the machine learning algorithm 508 in order to train the machine learning model 538. As discussed below, Approach 2 utilizes training data 502 in conjunction with the machine learning algorithm 508 for training. Approach 3 builds upon Approach 2, by utilizing the training data 502 and the training data 504 in conjunction with the machine learning algorithm 508. Moreover, Approach 4 builds upon Approaches 2 and 3, by utilizing the training data 502, the training data 504 and the training data 506 in conjunction with the machine learning algorithm 508.

Approach 2 may correspond with a supervised computer vision method of training. As seen in FIG. 5, the training data 502 includes the AVA images 510 and labels 512, which are provided as input to the machine learning algorithm 508. The AVA images 510 correspond to a large-scale AVA database for conducting aesthetic visual analysis. For example, the database contains multiple images (e.g., 250,000 images) together with metadata including a variety of aesthetic scores for each image, semantic labels for multiple categories (e.g., over 60 categories), and labels related to photographic style.

In one or more embodiments, the machine learning system 214 is configured to generate feature vectors (e.g., the features 524) corresponding to the AVA images 510. As noted above, the feature vectors may indicate respective values for, but not limited to, color mean/standard deviation, color histograms, local binary patterns and/or Gabor filter results. The feature vectors may be generated at least in part based on the metadata provided by the AVA database. Alternatively or in addition, the feature vectors may be generated at least in part based on computing respective image descriptors (as described above) for the AVA images 510.

In one or more embodiments, the labels 512 are based on the aesthetic scores provided by the AVA database for the AVA images 510. As noted above, the AVA database may include a variety of aesthetic scores for each image. Each of the labels 512 may correspond to a single aesthetic score that is based on one or more of the aesthetic scores provided by the AVA database (e.g., a single score, a mean score, a weighted score, etc.). In one or more embodiments, the aesthetic score for each of the labels 512 falls within a predefined range (e.g., between 1 and 10). Thus, the features 524 and the labels 512 are used by the machine learning algorithm 508 to train the machine learning model 538.

With respect to new image data (e.g., the video frames 530), the machine learning system 214 computes image descriptors and generates feature vectors (e.g., the features 536) as noted above. The machine learning model 538 receives the features 536 as input, and provides assessments 540 for the subset of video frames 534 as output. For example, the assessments 540 correspond to a score within a predefined range (e.g., between 1 and 10), similar in format to the above-described scores corresponding to labels 512. The messaging system 100 may select the video frame with the highest assessment (e.g., score) as the representative frame.

In one or more embodiments of Approach 2, the machine learning model 538 corresponds to a random forest model. For example, the machine learning model 538 corresponds to a Catboost model which uses gradient boosting on decision trees. The Catboost model may have been trained based on the AVA images 510 and labels 512, in order to generate the assessments 540.

It is noted that the domain for the AVA images 510 differs from the domain for the video frames 530. As noted above, the AVA images 510 are associated with an AVA database which corresponds to a first domain. On the other hand, the video frames 530 are associated with the messaging system 100 which corresponds to a second domain. In one or more embodiments, the AVA images 510 of the first domain have relatively higher image quality compared to the video frames 530 of the second domain. Algorithms 3 and 4 as discussed below provide for transferring knowledge (e.g., for training) between the first and second domains, without necessarily requiring extensive labelling (e.g., manual labelling) of training data.

As noted above, Approach 3 builds upon Approach 2, by utilizing the training data 504 in addition to the training data 502. Approach 3 may correspond with weakly-supervised training. The training data 504 corresponds to multiple images (e.g., video frames) stored in association with the messaging system 100 (e.g., the second domain). For example, the video frames are stored in the video table 316, and can correspond to video content for messages, content collections and/or user memories.

In one or more embodiments, the amount of video frames selected for the training data 504 is preset. For example, the machine learning system 214 may scrape a given number of videos from the video table 316. The machine learning system 214 may randomly select a preset number of the video frames or a preset percentage of video frames (e.g., 10%) from the group of scraped videos.

While not shown in FIG. 5, the machine learning system 214 is configured to weakly label the selected video frames. In one or more embodiments, the machine learning system 214 generates feature vectors for the selected video frames, using the above-described methods for generating feature vectors. The machine learning system 214 provides the generated feature vectors as input to the machine learning model 538, which at this stage had been previously trained with the AVA-based training data 502. The machine learning model 538 provides respective assessments (e.g., scores) based on the feature vectors, thereby labeling (e.g., weakly labeling) the selected video frames.

In addition, the machine learning system 214 is configured to decrease the image quality for the selected video frames. For example, the machine learning system 214 subtracts set amounts from the ranking for image manipulations with respect to downsampling/pixelization, exposure (e.g., high and/or low exposure) and Gaussian blur). In this manner, the machine learning system 214 is able to determine both (modified) scraped images 514 and (modified) generated labels 516 for the selected video frames. The machine learning system 214 may further determine features 526 (e.g., feature vectors) for the (modified) scraped images 514 using the above-described methods for generating feature vectors.

The machine learning system 214 is configured to further train the machine learning model 538 based on the features 526 and (modified) generated labels 516. In one or more embodiments, such training may include the feature vectors and weak labels for the original, un-modified versions of the selected video frames. By virtue of training the machine learning model 538 with the training data 504 per Approach 3, it is possible for the machine learning system 214 to explicitly train the machine learning model 538 with images of decreased quality.

After training based on Approach 3, the machine learning model 538 may generate assessments 540 (e.g., scores) with respect to new image data (e.g., the video frames 530) as described above. The video frame with the highest assessment (e.g., score) may be selected as the representative frame.

As noted above, Approach 4 builds upon Approaches 2 and 3, by utilizing the training data 506 in addition to the training data 502 and the training data 504. Approach 4 may correspond with self-training using labeled and unlabeled (e.g., which becomes pseudo-labeled) data. The training data 506 corresponds to multiple images (e.g., video frames) stored in association with the messaging system 100 (e.g., the second domain). For example, the video frames are stored in the video table 316, and can correspond to video content for messages, content collections and/or user memories.

In one or more embodiments, the amount of video frames selected for the training data 506 is preset. For example, the machine learning system 214 may scrape a given number of videos from the video table 316. The scraped videos may be the same, different, or at least partially different from as those scraped above with respect to Approach 3. Moreover, the machine learning system 214 selects a preset number of video frames (e.g., 1000 frames) from the group of scraped videos for labeling.

For example, the labeling may be performed manually by a human provided with instructions for certain image preferences. In one or more embodiments, the image preferences include one or more of: centering of a subject of the video frame; the subject being larger in the video frame; the subject being in the foreground of the video frame; the subject having a preferred expression or characteristic (e.g., smiling, eyes open, etc.); and/or increased color variation in the video frame. Thus, the selected video frames are labeled with labels 520.

In addition to training the machine learning model 538 with the training data 502 and the training data 504 described above, the machine learning system 214 provides for training the machine learning model 538 based on the labeled data. For the selected video frames that were labeled, the machine learning system 214 trains the machine learning model 538 with corresponding feature vectors via the machine learning algorithm 508.

Moreover, the machine learning system 214 provides additional training with respect to the unlabeled data (e.g., the video frames within the scraped videos which were not initially selected). The machine learning system 214 is configured to pseudo-label the unselected video frames, by submitting corresponding feature vectors for those unselected frames to the machine learning model 538 as trained with the labeled data. The machine learning model 538 provides assessments (e.g., scores) corresponding to the pseudo-labels for the unselected video frames.

In addition, the machine learning system 214 is configured to further train the machine learning model 538 based on the features 528 (for both the selected and un-selected video frames), the labels 520 and the pseudo-labels 522. By virtue of training the machine learning model 538 with the training data 506 per Approach 4, it is possible for the machine learning system 214 to self-train the machine learning model 538 with respect to labeled and unlabeled data.

For example, the machine learning system 214 provides for training the machine learning model 538 with initial training data (e.g., the training data 502, the training data 504, and the labeled video frames). In this regard, the machine learning model 538 may be viewed as a teacher to generate the pseudo-labels 522 for the unlabeled images. Then machine learning model 538 is trained as a student based on a combination of the labeled images (e.g., labels 520) and the unlabeled images (pseudo-labels 522), and the training is iterated by then treating the student as the teacher. During the learning by the student, the machine learning system 214 may inject noise (e.g., image noise such as random augmentation and/or model noise such as increased dropout rate, cross-entropy loss) to the student, so that the student may generalize better than the teacher.

While Approach 4 is described to build upon Approaches 2 and 3, it is possible that Approach 4 is implemented to build upon Approach 2 only (i.e., without using Approach 3). In such a case, the machine learning algorithm 508 would train the machine learning model 538 by using the training data 502 and the training data 506, and without using the training data 504.

After training based on Approach 4, the machine learning model 538 may generate assessments 540 (e.g., scores) with respect to new image data (e.g., the video frames 530) as described above. With respect to subjects in video frames, the machine learning system 214 may detect the subject based at least in part on the above-described object recognition algorithms. The video frame with the highest assessment (e.g., score) may be selected as the representative frame.

While the above-described examples relate to selecting a thumbnail image for a video (e.g., corresponding to the video frames 530), it is possible that the selected representative frame is used for different purposes. By way of non-limiting example, the selected frame may be used for one or more of: visual tagging of the video; labeling a highlighted part of the video; ranking the video relative to other videos for a video compilation; content curation of videos within a map interface; or generating an animated thumbnail based on multiple frames (e.g., a grouping of contiguous frames with a high ranking, or a grouping of frames contiguous with the highest-ranked frame).

By virtue of training using the above approaches, it is possible to reduce the amount of labeling required for training the machine learning model 538 via the machine learning algorithm 508. For example, instead of requiring manual labeling (e.g., by human annotating) for a large number of videos (e.g., in millions), the weak labeling and self-training as described herein allow for manual labeling for a smaller number of videos (e.g., in the hundreds or low thousands). Reducing the amount of labeling may in turn reduce the resources (e.g., computer resources and/or manpower) needed to train a machine learning model.

Figure 6A:
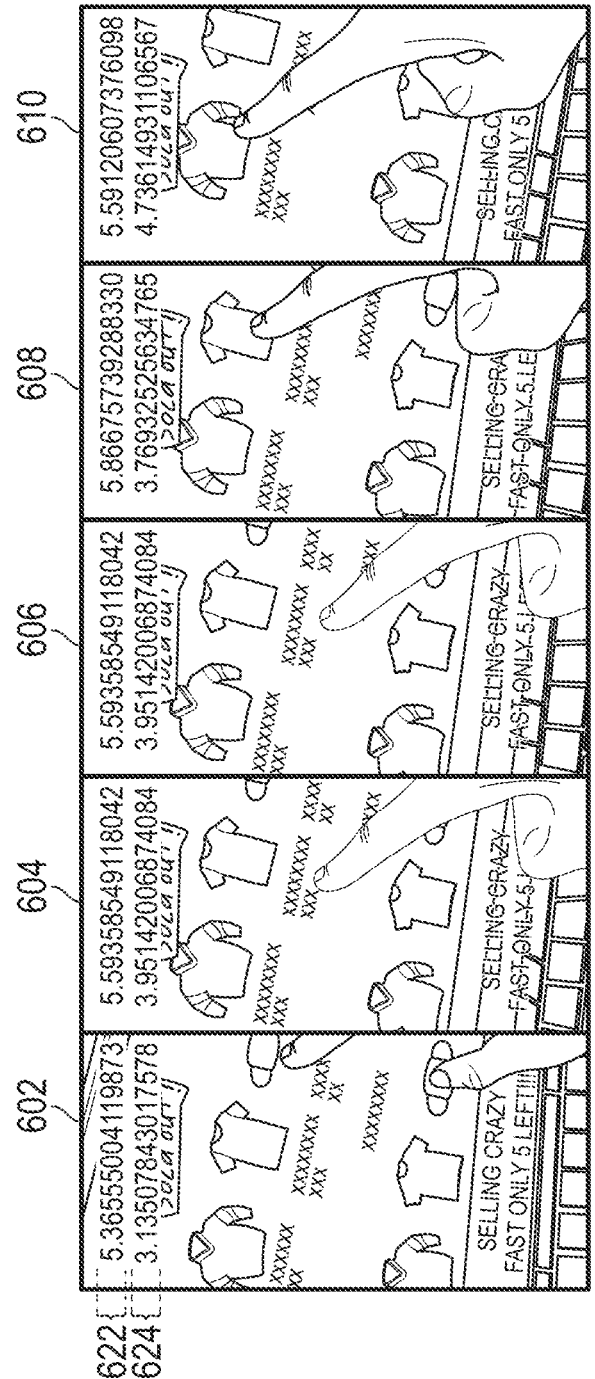
FIG. 6A illustrates examples of a representative video frame selected using different selection approaches, in accordance with some example embodiments.

FIG. 6A illustrates examples of a representative video frame selected using different selection approaches, in accordance with some example embodiments. In the example of FIG. 6A, a video including multiple video frames was provided as input to the machine learning model 538. In one or more embodiments, the video frame 602 corresponds to the first video frame of the video. On the other hand, the video frame 604, video frame 606, video frame 608 and video frame 610 correspond to the representative video frame (e.g., the video frame with the highest score) selected using Approach 1, Approach 2, Approach 3 and Approach 4, respectively.

Moreover, each of the images 602-610 depicts an Approach 3 score 622 and an Approach 4 score 624. For example, the Approach 3 score 622 corresponds to the assessment (e.g., score) of the respective image as computed by the machine learning model 538 with respect to Approach 3. It is noted that the assessment was used to determine the representative video frame selected by Approach 3, namely video frame 608. The Approach 4 score 624 corresponds to the assessment (e.g., score) of the respective image as computed by the machine learning model 538 with respect to Approach 4. The assessment was used to determine the representative video frame selected by Approach 4, namely video frame 610.

As seen in the example of FIG. 6A, the video frame 608 and video frame 610 respectively selected by Approach 3 and Approach 4 appear to be representative of the video. However, the video frame 610 selected by Approach 4 has the finger centered and pointing to the subject (e.g., a depicted shopping item) of the video. On the other hand, the images 602-606 may not be as representative, for example, due position/visibility of the subject, blur (not shown), and/or other undesirable image quality/preference characteristics as described above.

Figure 6B:
FIG. 6B illustrates other examples of a representative video frame selected using different selection approaches, in accordance with some example embodiments.

FIG. 6B illustrates other examples of a representative video frame selected using different selection approaches, in accordance with some example embodiments. In the example of FIG. 6B, a video including multiple video frames was provided as input to the machine learning model 538. In one or more embodiments, the video frame 612 corresponds to the first video frame of the video. On the other hand, the images 614-620 correspond to the representative video frame (e.g., the video frame with the highest score) selected using Approaches 1-4, respectively.

Moreover, each of the images 612-620 depicts an Approach 3 score 626 and an Approach 4 score 628. For example, the Approach 3 score 626 corresponds to the assessment (e.g., score) of the respective image as computed by the machine learning model 538 with respect to Approach 3. It is noted that the assessment was used to determine the representative video frame selected by Approach 3, namely video frame 618. The Approach 4 score 628 corresponds to the assessment (e.g., score) of the respective image as computed by the machine learning model 538 with respect to Approach 4. The assessment was used to determine the representative video frame selected by Approach 4, namely video frame 620.

As seen in the example of FIG. 6B, the video frame 620 selected by Approach 4 appears to be representative of the video. For example, Approach 4 demonstrates a preference for open eyes, minimal face blocking and image stillness. On the other hand, the images 612-616 may not be as representative, for example, due position/visibility of the subject, blur (not shown), and/or other undesirable image quality/preference characteristics as described above.

Figure 7:
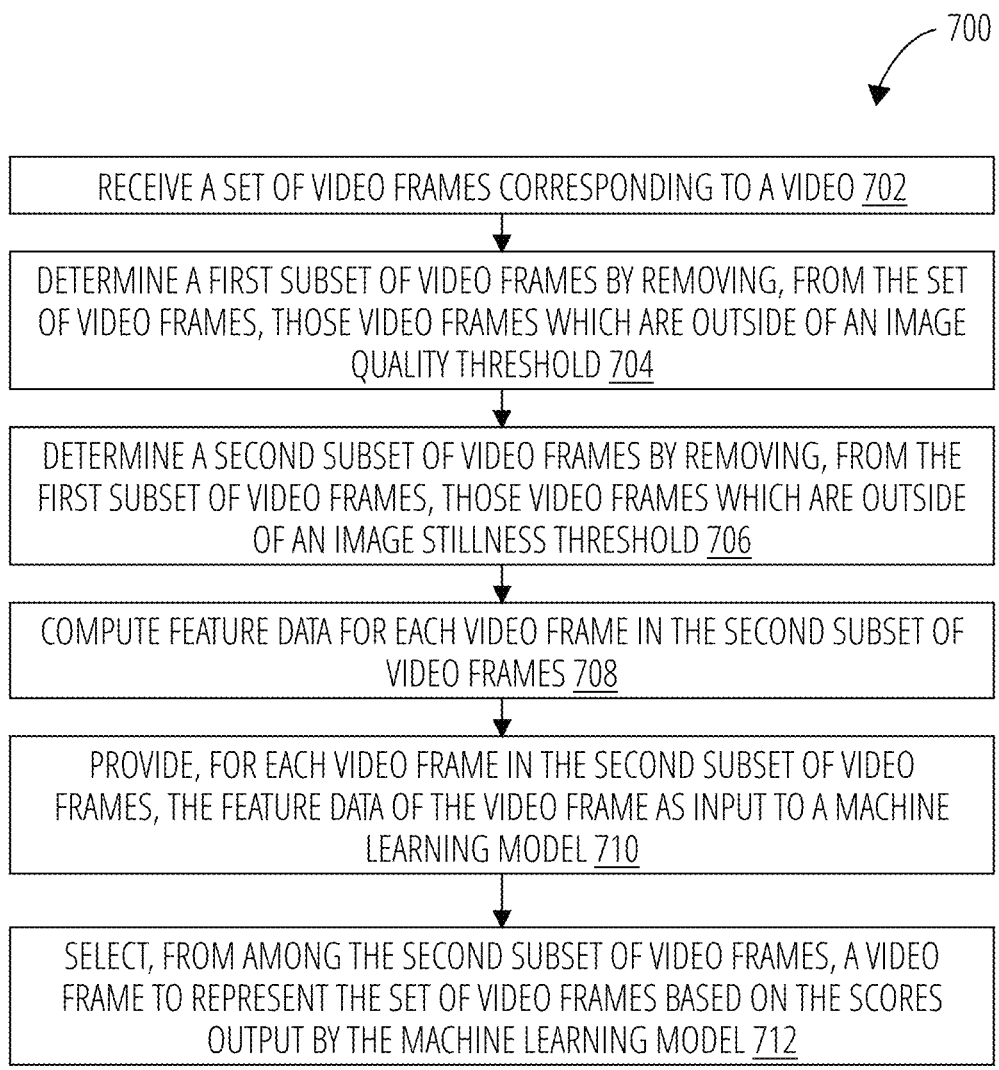
FIG. 7 is a flowchart illustrating a process for using machine learning to select a representative video frame, in accordance with some example embodiments.

FIG. 7 is a flowchart illustrating a process 700 for using machine learning to select a representative video frame, in accordance with some example embodiments. For explanatory purposes, the process 700 is primarily described herein with reference to the machine learning system 214 of FIG. 2 and FIG. 5. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

The machine learning system 214 receives a set of video frames corresponding to a video (block 702). The machine learning system 214 determines a first subset of video frames by removing, from the set of video frames, those video frames which are outside of an image quality threshold (block 704).

Determining the first subset of video frames may include applying, for each video frame in the set of video frames, respective image quantifiers that relate to luminance, sharpness, uniformity and blurriness of the video frame, and removing, from the set of video frames, those video frames which are above or below a preset threshold with respect to each of the respective image quantifiers.

The machine learning system 214 determines a second subset of video frames by removing, from the first subset of video frames, those video frames which are outside of an image stillness threshold (block 706). Determining the second subset of video frames may include calculating a respective stillness value, corresponding to pixel-wise frame difference, between consecutive video frames in the first subset of video frames, and removing, from the first subset of video frames, a preset amount of video frames based on the respective stillness values.

The machine learning system 214 computes feature data (e.g., a feature vector) for each video frame in the second subset of video frames (block 708). The machine learning system 214 provides, for each video frame in the second subset of video frames, the feature data of the video frame as input to a machine learning model (block 710). The machine learning model is configured to output a score for each video frame in the second subset of video frames based on the feature data of the video frame, the machine learning model having been trained with a first set of images labeled based on image aesthetics, and further having been trained with second set of images labeled based on image quality, the first and second set of images being associated with different domains.

The domain associated with the first set of images may correspond to an aesthetic visual analysis (AVA) database. The video may be stored in association with a messaging application, and the domain associated with the second set of images may correspond to the messaging application, the second set of images corresponding to additional videos stored in association with the messaging application. The second set of images may correspond to randomly-selected video frames in the additional videos stored in association with the messaging application.

Training of the machine learning model may include performing a first stage of training the machine learning model based on the first set of images, providing the second set of images as input to the machine learning model as trained in the first stage of training, in order to label the second set of images, generating a third set of images by decreasing image quality for the second set of images, and performing a second stage of training the machine learning model based on the labeled second set of images and the third set of images. Decreasing image quality for the second set of images is based on at least one of down-sampling, adjusting exposure or Gaussian blurring of the second set of images.

Training of the machine learning model may further include performing a third stage of training the machine learning model based on a labeled subset of images included within other videos stored in association with the messaging application, providing an unlabeled subset of images included within the other videos to the machine learning model having been trained by the third stage of training, in order to pseudo-label the unlabeled subset of video frames, and performing a fourth stage of training the machine learning model based on the labeled subset of images and the pseudo-labeled subset of images. The labeled subset of images may have been labeled based on a preference for at least one of a subject of the image being centered, the subject being larger, the subject being foregrounded, or the subject having a predefined expression or characteristic.

The machine learning system 214 selects, from among the second subset of video frames, a video frame to represent the set of video frames based on the scores output by the machine learning model (block 710). The selected video frame may correspond to a thumbnail image which represents the set of video frames. Alternatively or in addition, the selected video frame may be used for at least one of visual tagging of the video, labeling a highlighted part of the video, ranking the video relative to other videos for a video compilation, content curation of videos within a map interface, or generating an animated thumbnail based on other video frames selected to present the set of video frames.

Figure 8:
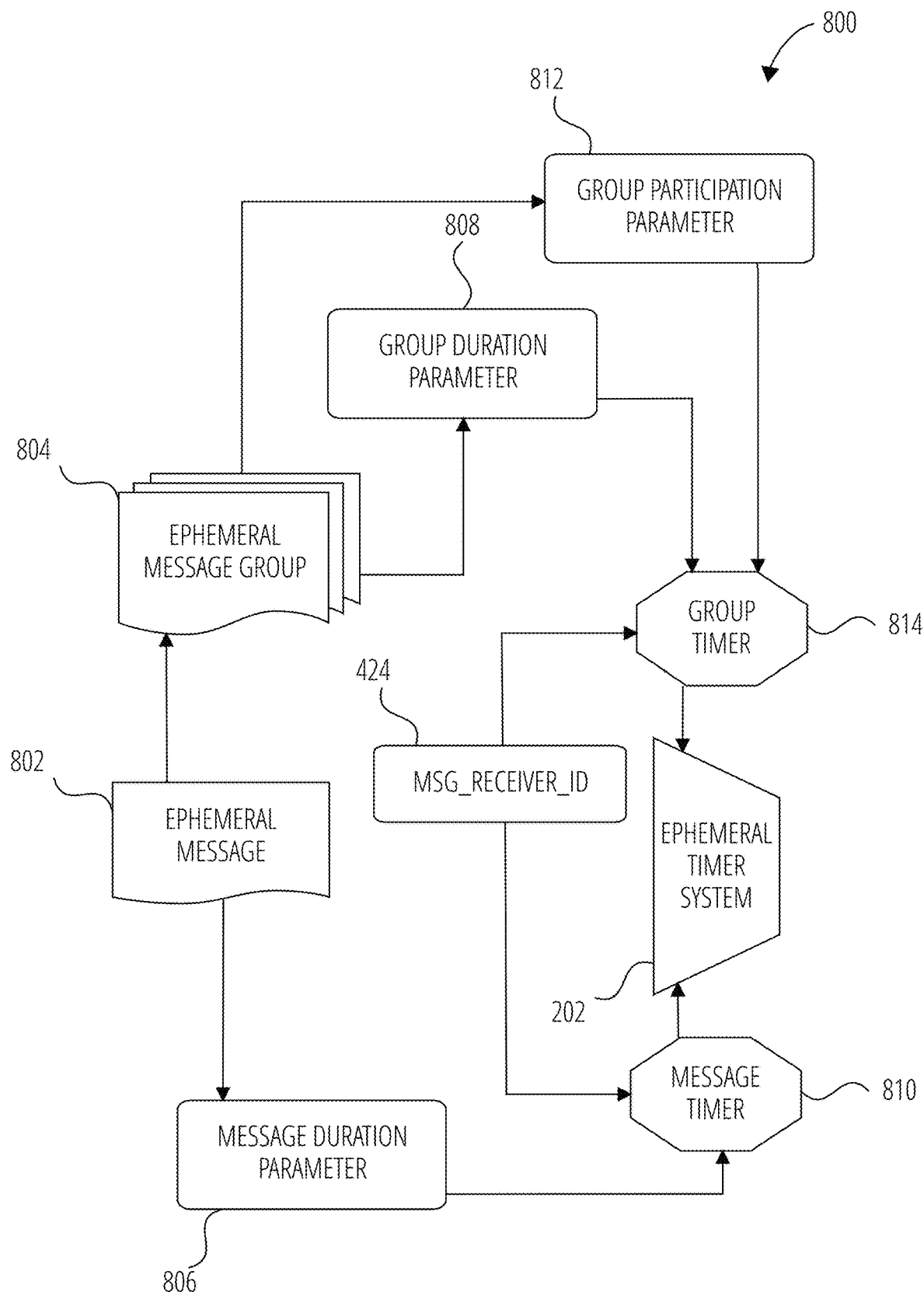
FIG. 8 is a flowchart for an access-limiting process, in accordance with some example embodiments.

FIG. 8 is a schematic diagram illustrating an access-limiting process s 800, in terms of which access to content (e.g., an ephemeral message 802, and associated multimedia payload of data) or a content collection (e.g., an ephemeral message group 804) may be time-limited (e.g., made ephemeral).

An ephemeral message 802 is shown to be associated with a message duration parameter 806, the value of which determines an amount of time that the ephemeral message 802 will be displayed to a receiving user of the ephemeral message 802 by the messaging client 104. In one example, an ephemeral message 802 is viewable by a receiving user for up to a maximum of 10 seconds, depending on the amount of time that the sending user specifies using the message duration parameter 806.

The message duration parameter 806 and the message receiver identifier 424 are shown to be inputs to a message timer 810, which is responsible for determining the amount of time that the ephemeral message 802 is shown to a particular receiving user identified by the message receiver identifier 424. In particular, the ephemeral message 802 will only be shown to the relevant receiving user for a time period determined by the value of the message duration parameter 806. The message timer 810 is shown to provide output to a more generalized ephemeral timer system 202, which is responsible for the overall timing of display of content (e.g., an ephemeral message 802) to a receiving user.

The ephemeral message 802 is shown in FIG. 8 to be included within an ephemeral message group 804 (e.g., a collection of messages in a personal story, or an event story). The ephemeral message group 804 has an associated group duration parameter 808, a value of which determines a time duration for which the ephemeral message group 804 is presented and accessible to users of the messaging system 100. The group duration parameter 808, for example, may be the duration of a music concert, where the ephemeral message group 804 is a collection of content pertaining to that concert. Alternatively, a user (either the owning user or a curator user) may specify the value for the group duration parameter 808 when performing the setup and creation of the ephemeral message group 804.

Additionally, each ephemeral message 802 within the ephemeral message group 804 has an associated group participation parameter 812, a value of which determines the duration of time for which the ephemeral message 802 will be accessible within the context of the ephemeral message group 804. Accordingly, a particular ephemeral message group 804 may "expire" and become inaccessible within the context of the ephemeral message group 804, prior to the ephemeral message group 804 itself expiring in terms of the group duration parameter 808. The group duration parameter 808, group participation parameter 812, and message receiver identifier 424 each provide input to a group timer 814, which operationally determines, firstly, whether a particular ephemeral message 802 of the ephemeral message group 804 will be displayed to a particular receiving user and, if so, for how long. Note that the ephemeral message group 804 is also aware of the identity of the particular receiving user as a result of the message receiver identifier 424.

Accordingly, the group timer 814 operationally controls the overall lifespan of an associated ephemeral message group 804, as well as an individual ephemeral message 802 included in the ephemeral message group 804. In one example, each and every ephemeral message 802 within the ephemeral message group 804 remains viewable and accessible for a time period specified by the group duration parameter 808. In a further example, a certain ephemeral message 802 may expire, within the context of ephemeral message group 804, based on a group participation parameter 812. Note that a message duration parameter 806 may still determine the duration of time for which a particular ephemeral message 802 is displayed to a receiving user, even within the context of the ephemeral message group 804. Accordingly, the message duration parameter 806 determines the duration of time that a particular ephemeral message 802 is displayed to a receiving user, regardless of whether the receiving user is viewing that ephemeral message 802 inside or outside the context of an ephemeral message group 804.

The ephemeral timer system 202 may furthermore operationally remove a particular ephemeral message 802 from the ephemeral message group 804 based on a determination that it has exceeded an associated group participation parameter 812. For example, when a sending user has established a group participation parameter 812 of 24 hours from posting, the ephemeral timer system 202 will remove the relevant ephemeral message 802 from the ephemeral message group 804 after the specified 24 hours. The ephemeral timer system 202 also operates to remove an ephemeral message group 804 when either the group participation parameter 812 for each and every ephemeral message 802 within the ephemeral message group 804 has expired, or when the ephemeral message group 804 itself has expired in terms of the group duration parameter 808.

In certain use cases, a creator of a particular ephemeral message group 804 may specify an indefinite group duration parameter 808. In this case, the expiration of the group participation parameter 812 for the last remaining ephemeral message 802 within the ephemeral message group 804 will determine when the ephemeral message group 804 itself expires. In this case, a new ephemeral message 802, added to the ephemeral message group 804, with a new group participation parameter 812, effectively extends the life of an ephemeral message group 804 to equal the value of the group participation parameter 812.

Responsive to the ephemeral timer system 202 determining that an ephemeral message group 804 has expired (e.g., is no longer accessible), the ephemeral timer system 202 communicates with the messaging system 100 (and, for example, specifically the messaging client 104) to cause an indicium (e.g., an icon) associated with the relevant ephemeral message group 804 to no longer be displayed within a user interface of the messaging client 104. Similarly, when the ephemeral timer system 202 determines that the message duration parameter 806 for a particular ephemeral message 802 has expired, the ephemeral timer system 202 causes the messaging client 104 to no longer display an indicium (e.g., an icon or textual identification) associated with the ephemeral message 802.

Figure 9:
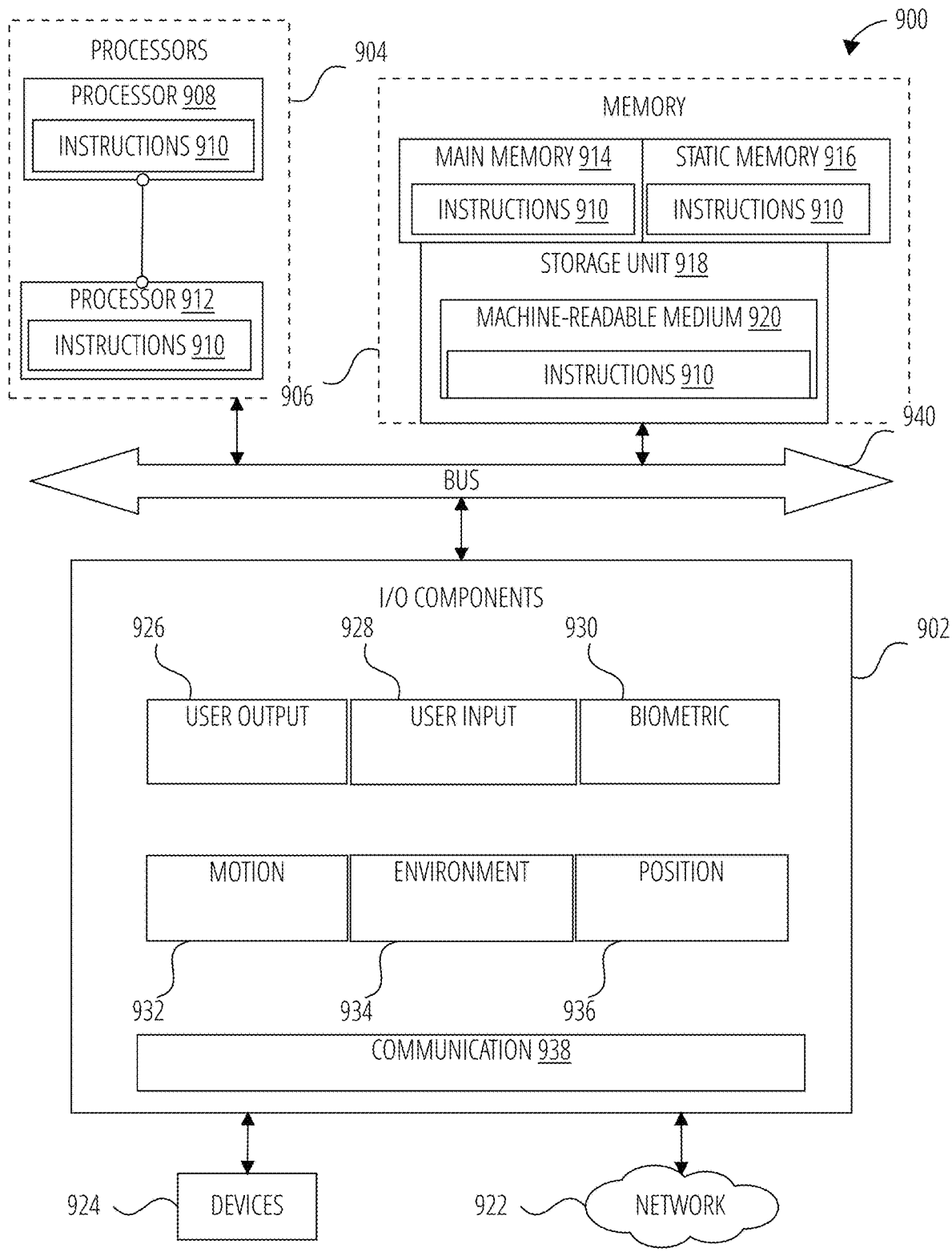
FIG. 9 is a diagrammatic representation of a machine in the form of a computer system within which a set of instructions may be executed for causing the machine to perform any one or more of the methodologies discussed herein, in accordance with some example embodiments.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the U/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Figure 10:
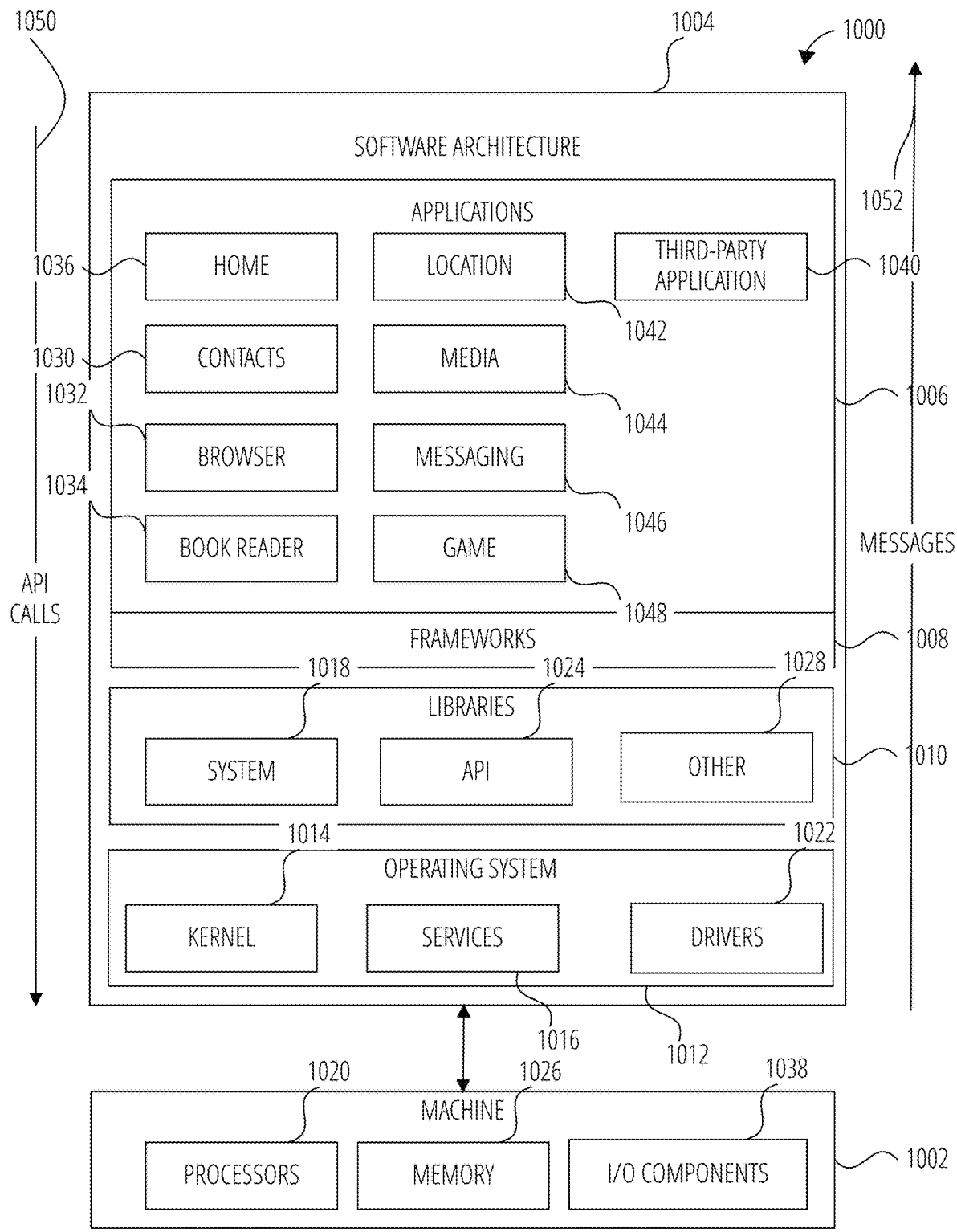
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   receiving a set of video frames corresponding to a video;
   determining a first subset of video frames by removing, from the set of video frames, those video frames which are outside of an image quality threshold;
   determining a second subset of video frames by removing, from the first subset of video frames, those video frames which are outside of an image stillness threshold;
   computing feature data for each video frame in the second subset of video frames;
   providing, for each video frame in the second subset of video frames, the feature data of the video frame as input to a machine learning model,
   wherein the machine learning model is configured to output a score for each video frame in the subset of video frames based on the feature data of the video frame, the machine learning model having been trained with a first set of images labeled based on image aesthetics, and further having been trained with second set of images labeled based on image quality; and
   selecting, from among the second subset of video frames, a video frame to represent the set of video frames based on the scores output by the machine learning model.

2. The method of claim 1, wherein determining the first subset of video frames comprises:
   applying, for each video frame in the set of video frames, respective image quantifiers that relate to luminance, sharpness, uniformity and blurriness of the video frame; and
   removing, from the set of video frames, those video frames which are above or below a preset threshold with respect to each of the respective image quantifiers.

3. The method of claim 1, wherein determining the second subset of video frames comprises:
   calculating a respective stillness value, corresponding to pixel-wise frame difference, between consecutive video frames in the first subset of video frames; and
   removing, from the first subset of video frames, a preset amount of video frames based on the respective stillness values.

4. The method of claim 1, wherein a domain associated with the first set of images corresponds to an aesthetic visual analysis (AVA) database,
   wherein the video is stored in association with a messaging application, and
   wherein a domain associated with the subset of images corresponds to the messaging application, the second set of images corresponding to additional videos stored in association with the messaging application.

5. The method of claim 4, wherein the second set of images corresponds to randomly-selected video frames in the additional videos stored in association with the messaging application.

6. The method of claim 4, wherein training of the machine learning model comprises:
   performing a first stage of training the machine learning model based on the first set of images;
   providing the second set of images as input to the machine learning model as trained in the first stage of training, in order to label the second set of images;
   generating a third set of images by decreasing image quality for the second set of images; and
   performing a second stage of training the machine learning model based on the labeled second set of images and the third set of images.

7. The method of claim 6, wherein decreasing image quality for the second set of images is based on at least one of down-sampling, adjusting exposure or Gaussian blurring of the second set of images.

8. The method of claim 6, wherein training of the machine learning model further comprises:
   performing a third stage of training the machine learning model based on a labeled subset of images included within other videos stored in association with the messaging application;
   providing an unlabeled subset of images included within the other videos to the machine learning model having been trained by the third stage of training, in order to pseudo-label the unlabeled subset of images; and
   performing a fourth stage of training the machine learning model based on the labeled subset of images and the pseudo-labeled subset of images.

9. The method of claim 8, the labeled subset of images having been labeled based on a preference for at least one of a subject of the image being centered, the subject being larger, the subject being foregrounded, or the subject having a predefined expression or characteristic.

10. The method of claim 1, wherein the selected video frame corresponds to a thumbnail image which represents the set of video frames.

11. The method of claim 1, wherein the selected video frame is used for at least one of visual tagging of the video, labeling a highlighted part of the video, ranking the video relative to other videos for a video compilation, content curation of videos within a map interface, or generating an animated thumbnail based on other video frames selected to present the set of video frames.

12. A system comprising:
   at least one processor; and
   a memory storing instructions that, when executed by the at least one processor, configure the at least one processor to perform operations comprising:
   receiving a set of video frames corresponding to a video;
   determining a first subset of video frames by removing, from the set of video frames, those video frames which are outside of an image quality threshold;
   determining a second subset of video frames by removing, from the first subset of video frames, those video frames which are outside of an image stillness threshold;
   computing feature data for each video frame in the second subset of video frames;
   providing, for each video frame in the second subset of video frames, the feature data of the video frame as input to a machine learning model,
   wherein the machine learning model is configured to output a score for each video frame in the subset of video frames based on the feature data of the video frame, the machine learning model having been trained with a first set of images labeled based on image aesthetics, and further having been trained with second set of images labeled based on image quality; and
   selecting, from among the second subset of video frames, a video frame to represent the set of video frames based on the scores output by the machine learning model.

13. The system of claim 12, wherein determining the first subset of video frames comprises:
   applying, for each video frame in the set of video frames, respective image quantifiers that relate to luminance, sharpness, uniformity and blurriness of the video frame; and
   removing, from the set of video frames, those video frames which are above or below a preset threshold with respect to each of the respective image quantifiers.

14. The system of claim 12, wherein determining the second subset of video frames comprises:
   calculating a respective stillness value, corresponding to pixel-wise frame difference, between consecutive video frames in the first subset of video frames; and
   removing, from the first subset of video frames, a preset amount of video frames based on the respective stillness values.

15. The system of claim 12, wherein a domain associated with the first set of images corresponds to an aesthetic visual analysis (AVA) database,
   wherein the video is stored in association with a messaging application, and
   wherein a domain associated with the subset of images corresponds to the messaging application, the second set of images corresponding to additional videos stored in association with the messaging application.

16. The system of claim 15, wherein the second set of images corresponds to randomly-selected video frames in the additional videos stored in association with the messaging application.

17. The system of claim 15, wherein training of the machine learning model comprises:
   performing a first stage of training the machine learning model based on the first set of images;
   providing the second set of images as input to the machine learning model as trained in the first stage of training, in order to label the second set of images;
   generating a third set of images by decreasing image quality for the second set of images; and
   performing a second stage of training the machine learning model based on the labeled second set of images and the third set of images.

18. The system of claim 17, wherein decreasing image quality for the second set of images is based on at least one of down-sampling, adjusting exposure or Gaussian blurring of the second set of images.

19. The system of claim 17, wherein training of the machine learning model further comprises:
   performing a third stage of training the machine learning model based on a labeled subset of images included within other videos stored in association with the messaging application;
   providing an unlabeled subset of images included within the other videos to the machine learning model having been trained by the third stage of training, in order to pseudo-label the unlabeled subset of images; and
   performing a fourth stage of training the machine learning model based on the labeled subset of images and the pseudo-labeled subset of images.

20. A non-transitory computer-readable storage medium, the computer-readable storage medium including instructions that when executed by a computer, cause the computer to perform operations comprising:
   receiving a set of video frames corresponding to a video;
   determining a first subset of video frames by removing, from the set of video frames, those video frames which are outside of an image quality threshold;
   determining a second subset of video frames by removing, from the first subset of video frames, those video frames which are or outside of an image stillness threshold;
   computing feature data for each video frame in the second subset of video frames;
   providing, for each video frame in the second subset of video frames, the feature data of the video frame as input to a machine learning model,
   wherein the machine learning model is configured to output a score for each video frame in the subset of video frames based on the feature data of the video frame, the machine learning model having been trained with a first set of images labeled based on image aesthetics, and further having been trained with second set of images labeled based on image quality; and
   selecting, from among the second subset of video frames, a video frame to represent the set of video frames based on the scores output by the machine learning model.

* * * * *

UNITED STATES PATENT AND TRADEMARK OFFICE
CERTIFICATE OF CORRECTION

| | | |
|---|---|---|
| PATENT NO. | : 12,354,355 B2 | Page 1 of 1 |
| APPLICATION NO. | : 18/653718 | |
| DATED | : July 8, 2025 | |
| INVENTOR(S) | : Kopparapu et al. | |

It is certified that error appears in the above-identified patent and that said Letters Patent is hereby corrected as shown below:

On the Title Page

Item (72), in "Inventors", in Column 1, Line 7, delete "Ray," and insert --Rey,-- therefor In the Claims In Column 38, Line 47, in Claim 20, after "are", delete "or"

Signed and Sealed this
Twenty-seventh Day of January, 2026

John A. Squires
*Director of the United States Patent and Trademark Office*